(12) United States Patent
Wanie

(10) Patent No.: US 7,030,768 B2
(45) Date of Patent: Apr. 18, 2006

(54) WATER SOFTENER MONITORING DEVICE

(76) Inventor: Andrew J. Wanie, W208 N16581 Celtic Ct., Jackson, WI (US) 53037

( * ) Notice: Subject to any disclaimer, the term of this patent is extended or adjusted under 35 U.S.C. 154(b) by 51 days.

(21) Appl. No.: 10/675,641

(22) Filed: Sep. 30, 2003

(65) Prior Publication Data

US 2005/0068186 A1 Mar. 31, 2005

(51) Int. Cl.
*G08B 21/00* (2006.01)

(52) U.S. Cl. ............... 340/618; 340/612; 73/304 C

(58) Field of Classification Search ............ 340/618, 340/612; 73/304 C, 290 R, 291, 293, 301, 73/302, 303; 200/61.2; 137/392

See application file for complete search history.

(56) References Cited

U.S. PATENT DOCUMENTS

| | | | |
|---|---|---|---|
| 4,169,543 A * | 10/1979 | Hall ............................ 222/56 |
| 4,332,678 A | 6/1982 | Spiegl |
| 4,986,902 A | 1/1991 | Serna |
| 4,987,409 A | 1/1991 | Jackson |
| 5,132,669 A | 7/1992 | Jackson |
| 5,147,531 A | 9/1992 | Dougal |
| 5,239,205 A | 8/1993 | Hoffman et al. |
| 5,239,285 A * | 8/1993 | Rak ............................ 340/623 |
| 5,297,428 A | 3/1994 | Carr et al. |
| 5,340,954 A | 8/1994 | Hoffman et al. |
| 5,363,087 A | 11/1994 | Johannsen et al. |
| 5,477,727 A | 12/1995 | Koga ............................ 73/304 |
| 5,512,834 A | 4/1996 | McEwan |
| 5,818,128 A | 10/1998 | Hoffman et al. |
| 5,832,772 A * | 11/1998 | McEwan ............ 73/290 R |
| 6,014,076 A * | 1/2000 | Luzzader ............ 340/521 |
| 6,016,697 A | 1/2000 | McCulloch et al. ........ 73/304 |
| 6,023,159 A | 2/2000 | Heger |
| 6,188,228 B1 | 2/2001 | Philipp |
| 6,192,693 B1 | 2/2001 | Kloppenberg et al. |
| 6,218,949 B1 * | 4/2001 | Issachar ............ 340/624 |
| 6,281,802 B1 | 8/2001 | Venable et al. |
| 6,287,458 B1 | 9/2001 | Lawrence |
| 6,309,551 B1 | 10/2001 | Suchecki, Jr. et al. |
| 6,456,202 B1 | 9/2002 | Johannsen et al. |
| 6,490,920 B1 | 12/2002 | Netzer ............ 73/304 |
| 6,650,126 B1 | 11/2003 | Indihar ............ 324/658 |
| 6,661,239 B1 | 12/2003 | Ozick ............ 324/658 |

(Continued)

OTHER PUBLICATIONS

"Ultra-Thin Capacaitive Flat Pak Proximity Sensors Offer Versatile Mounting & Long Range", Minneapolis, MN, Oct. 10, 2001, Press Release—QF 5.5.

*Primary Examiner*—Jeffery Hofsass
*Assistant Examiner*—Jennifer Stone
(74) *Attorney, Agent, or Firm*—Boyle Fredrickson Newholm Stein & Gratz S.C.

(57) ABSTRACT

A device for monitoring the level or amount of a material within a container is provided. The device includes a detection mechanism that can be a direct detection mechanism or an indirect detection mechanism. When the detection mechanism senses an upper level of the substance in the container that is below a predetermined lower limit for the substance, the mechanism operates an alarm mechanism to emit an audible and/or visible alarm to alert an individual to the low level of the substance within the container. The alarm mechanism can be integrally formed with the detection mechanism, or can be spaced from the detection mechanism in order to provide a more accessible point for the viewing or hearing of the alarm emitted by the alarm mechanism.

20 Claims, 20 Drawing Sheets

U.S. PATENT DOCUMENTS

| | | | |
|---|---|---|---|
| 6,672,155 B1 | 1/2004 | Muller et al. | 73/290 |
| 6,674,141 B1 | 1/2004 | Kubena et al. | 257/417 |
| 2001/0054966 A1 | 12/2001 | Johannsen et al. | |
| 2002/0149489 A1 | 10/2002 | Bearak | |
| 2002/0178808 A1* | 12/2002 | Hafer | 73/304 C |
| 2004/0046672 A1* | 3/2004 | Kasik et al. | 340/612 |

* cited by examiner

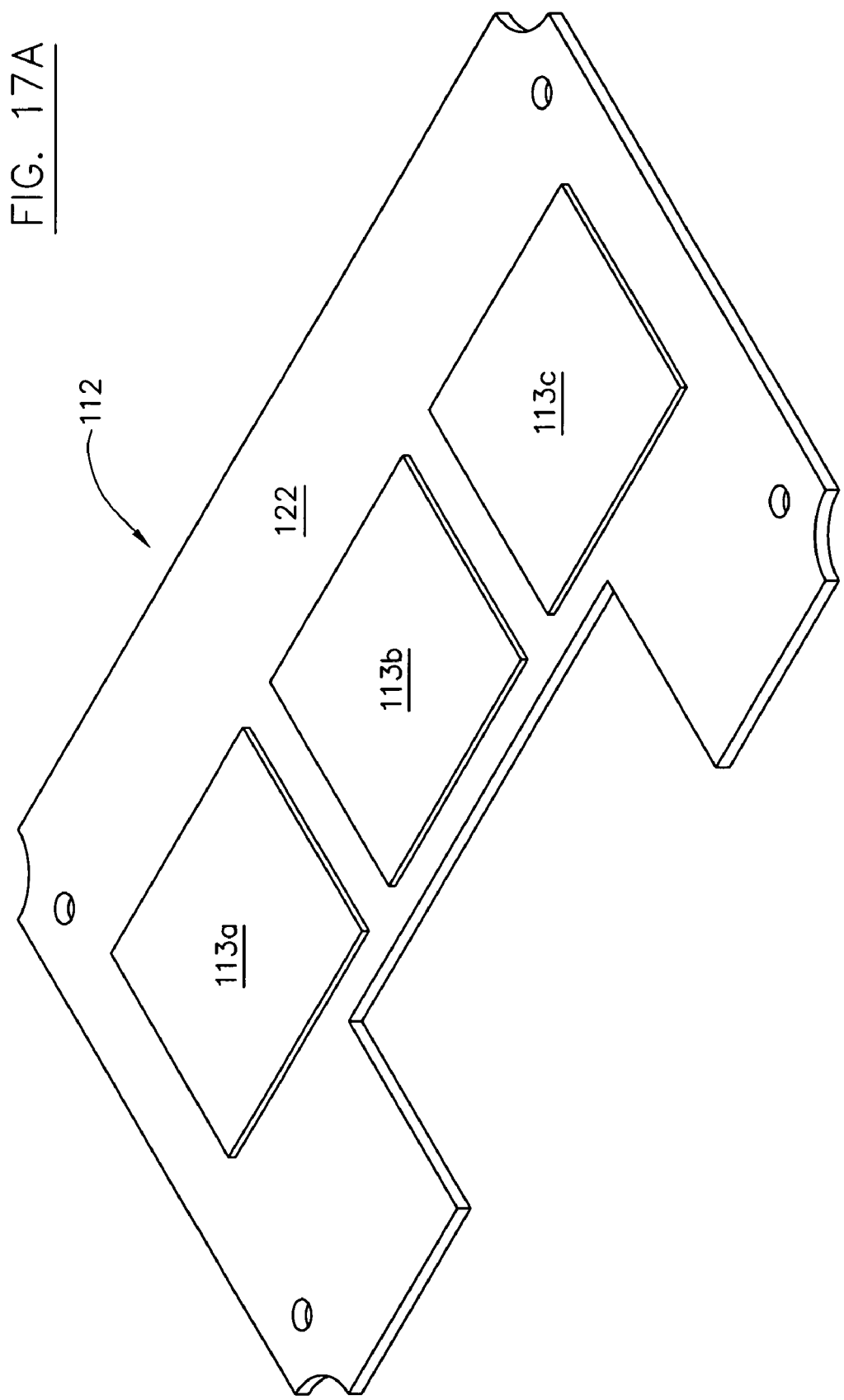

WATER SOFTENER MONITORING DEVICE

FIELD OF THE INVENTION

The present invention relates to water softener salt tanks, and more specifically to a device which continuously monitors the level of the salt contained within the tank and activates an alarm when an unacceptably low level of salt is reached within the tank.

BACKGROUND OF THE INVENTION

Water softeners are used to soften hard water prior to the water being utilized by an individual. The water softener includes a salt tank through which water and salt form a brine solution which is used to flush the resin bed of the water softener, removing contaminants from the bed.

During operation of the water softener, the salt contained in the water softener salt tank is used up over time, such that the salt needs to be replenished in order to maintain the effectiveness of the water softener. However, due to the normal placement of water softeners within a home, i.e., often in a basement in the well pump room, and the opaque materials utilized to form the tanks in which the salt is contained, many times the salt in the water softener salt tank is unknowingly completely exhausted, such that it can no longer form a brine solution and that water used thereafter by an individual is "hard."

To remedy this problem, a number of different monitoring devices for water softener salt tanks have been developed. The majority of these mechanisms involve a number of interacting parts which, when the salt reaches a predetermined lower limit in the tank, operate to provide some type of indication to a user that the salt in the water softener tank needs to be replenished.

While the majority of these devices are generally effective in providing an indication to an individual when salt in a water softener tank needs to be replenished, the costs for assembly and/or maintenance of these prior art monitoring devices are often high due to the large number of interacting or interconnected components of the devices which do not hold up well under the harsh conditions formed by the salt water present in the water softener tank. The devices are also cumbersome to install for the average user.

Therefore, it is desirable to develop a monitoring device for a water softener salt tank that is not constructed from a large number of parts, and that is capable of accurately determining the amount of salt remaining in the water softener salt tank, and is more easily installed outside the harsh environment of the tank. It is also desirable to develop a monitoring device which can be adapted for use with a variety of water softener tanks without requiring significant modifications to the device.

SUMMARY OF THE INVENTION

According to one aspect of the present invention, a water softener salt tank monitoring device is provided in which the device includes a sensor capable of determining the level of salt remaining in the tank. The sensor has a housing adapted to be positioned on the exterior of the water softener salt tank. The sensor also includes a detection mechanism capable of determining how much salt remains within the water softener salt tank. When the detection mechanism determines that the level of salt within the tank has fallen below a predetermined lower limit, the sensor activates an alarm mechanism that is operably connected to the detection mechanism in order to provide an audible, visible, or combined signal to an individual indicating that the salt in the water softener salt tank needs to be replenished. The alarm mechanism can be formed as a single unit with the detection mechanism in the sensor, or can be formed as a separate unit that can be spaced from the sensor. When the alarm mechanism is formed separately and spaced from the sensor, the alarm mechanism can be activated by a signal sent to the alarm mechanism from the sensor.

According to another aspect of the present invention, the detection mechanism utilized with the sensor can be a direct detection mechanism that is positionable in direct contact with the salt within the water softener salt tank. The direct detection mechanism rests on an upper surface of the salt and is continuously lowered with respect to the tank as the salt within the tank is dissolved during the water softening process. When the salt level and direct detection mechanism reach a predetermined lower limit, the direct detection mechanism engages the sensor in order to operate the alarm mechanism.

According to still another aspect of the present invention, the detection mechanism for the sensor can be an indirect detection mechanism employing a capacitance-based system, infra-red wave, or electromagnetic wave-based detection system located in the housing for the sensor. With either system, the sensor housing is preferably positioned on the exterior of the water softener tank adjacent a lower limit for the level of the salt within the tank. The indirect detection mechanism then monitors the level of the salt within the tank by obtaining either capacitance or electromagnetic wave data on the salt in the tank and using this data to determine whether the amount of salt in the tank has reached the lower limit. At that point, the indirect detection mechanism actuates the alarm mechanism to inform an individual, audibly and/or visually, that the salt within the water softener salt tank needs to be replenished.

The sensor can also be modified to include a separate or second indirect detection mechanism which provides reference data or a reference value to the first indirect detection mechanism in order to accurately determine the level of the salt within the tank. The reference value provided by the second mechanism is used by the first mechanism to compare the reference value with an actual value obtained by the first mechanism. If the actual value is equal to or above the reference value, the sensor can activate the alarm mechanism to inform the individual that the salt level is at or below the lower limit in the tank.

Other objects, advantages and features of the present invention will be made apparent from the following detailed description taken together with the drawing figures.

BRIEF DESCRIPTION OF THE DRAWINGS

The drawings illustrate the best mode currently contemplated of practicing the present invention.

In the drawings:

FIG. 17a is an isometric view of a plate of another embodiment of the present invention;

DETAILED DESCRIPTION

Figure 1:
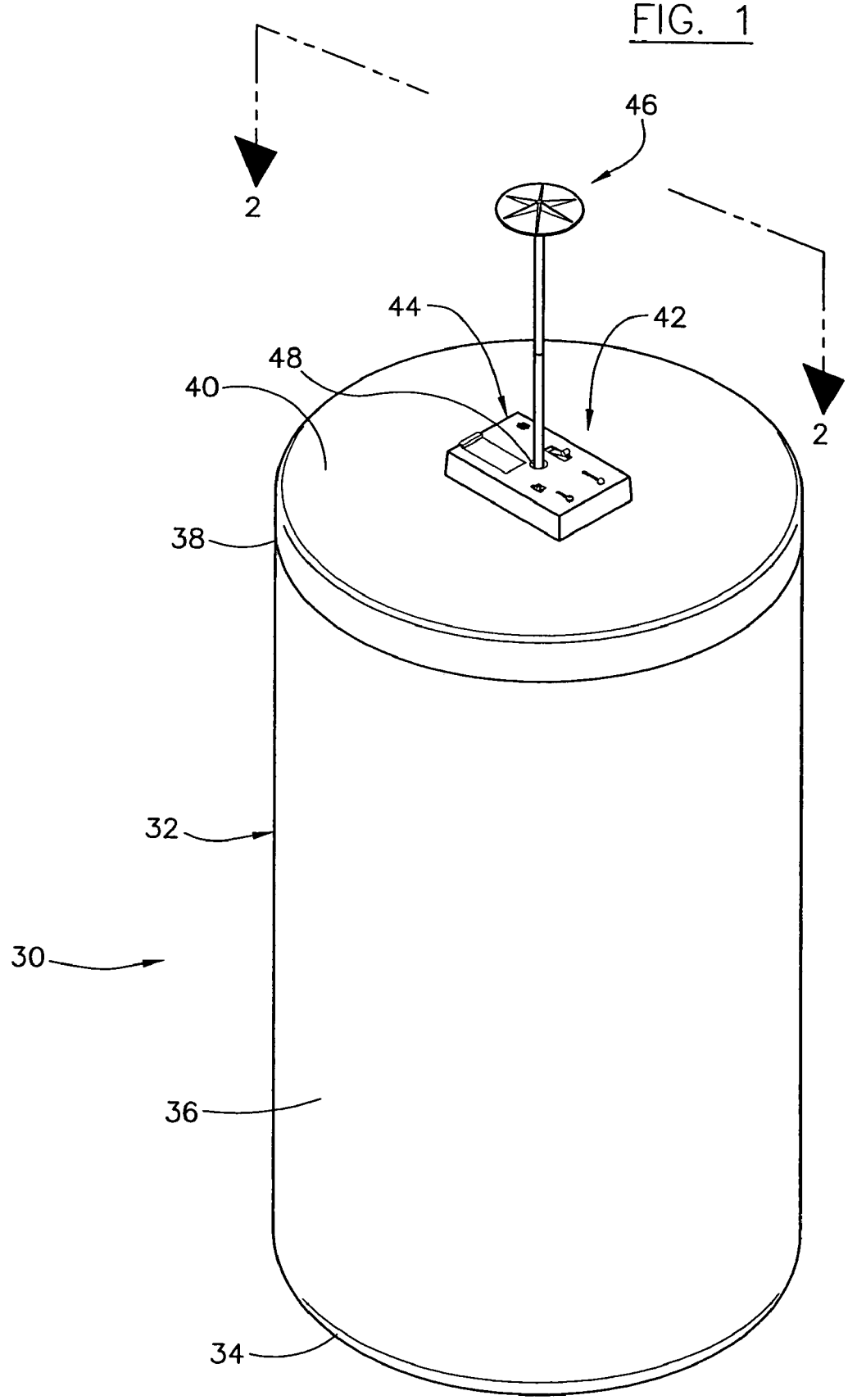
FIG. 1 is an isometric view of a water softener tank including a first embodiment of the monitoring device of the present invention.

With reference now to the drawing figures in which like reference numerals designate like parts throughout the disclosure, a water softener salt tank is indicated generally at 30 in FIG. 1. The tank 30 is generally rectangular in shape and includes a preferably plastic body 32 having a closed lower end 34, a generally cylindrical sidewall 36 extending upwardly from the lower end 34 and an open upper end 38 opposite the lower end 34. The tank 30 also includes a cover 40 releasably engageable with the upper end 38 in order to enclose the body 32.

Referring now to FIGS. 1–4, a tank 30 also includes a monitoring device 42 mounted to the cover 40. A device 42 includes a sensor 44 positioned on the cover 40 opposite the body 32 and a detection mechanism 46 connected to and extending through the sensor 44. The mechanism 46 is positioned partially within and partially outside of the tank 30 by extending the mechanism 46 through an opening 48 in the sensor 44 that is aligned with a similar opening 50 in the cover 40.

Looking now at FIGS. 2–8, the detection mechanism 46 is a direct detection mechanism including a lower disk member 52 positioned within the tank 30, an upper disk member 54 positioned outside of the tank 30, and a central member 56 extending between the lower member 52 and upper member 54. Each of the components of the detection mechanism 46 is formed from a generally rigid, inert material, such as a hard plastic, and preferably ABS plastic, that is not detrimentally affected by prolonged exposure to salinic conditions and is relatively easy to form into the components of the mechanism 46. Further, while the lower member 52 and upper member 54 are generally circular in shape and extend radially outwardly from the point of connection of each of the lower member 52 and upper member 54 to the central member 56, the lower and upper members can have any desired shape. The lower member 52 rests on an upper surface 200 of an amount of salt 202 positioned within the body 32 of the tank 30. Further, the central member 56 is formed to have a diameter slightly less than the diameter of the opening 48 in the sensor 44 and opening 50 in the cover 40, such that the central member 56 can slide with respect to the sensor 44 and cover 40.

Figure 2:
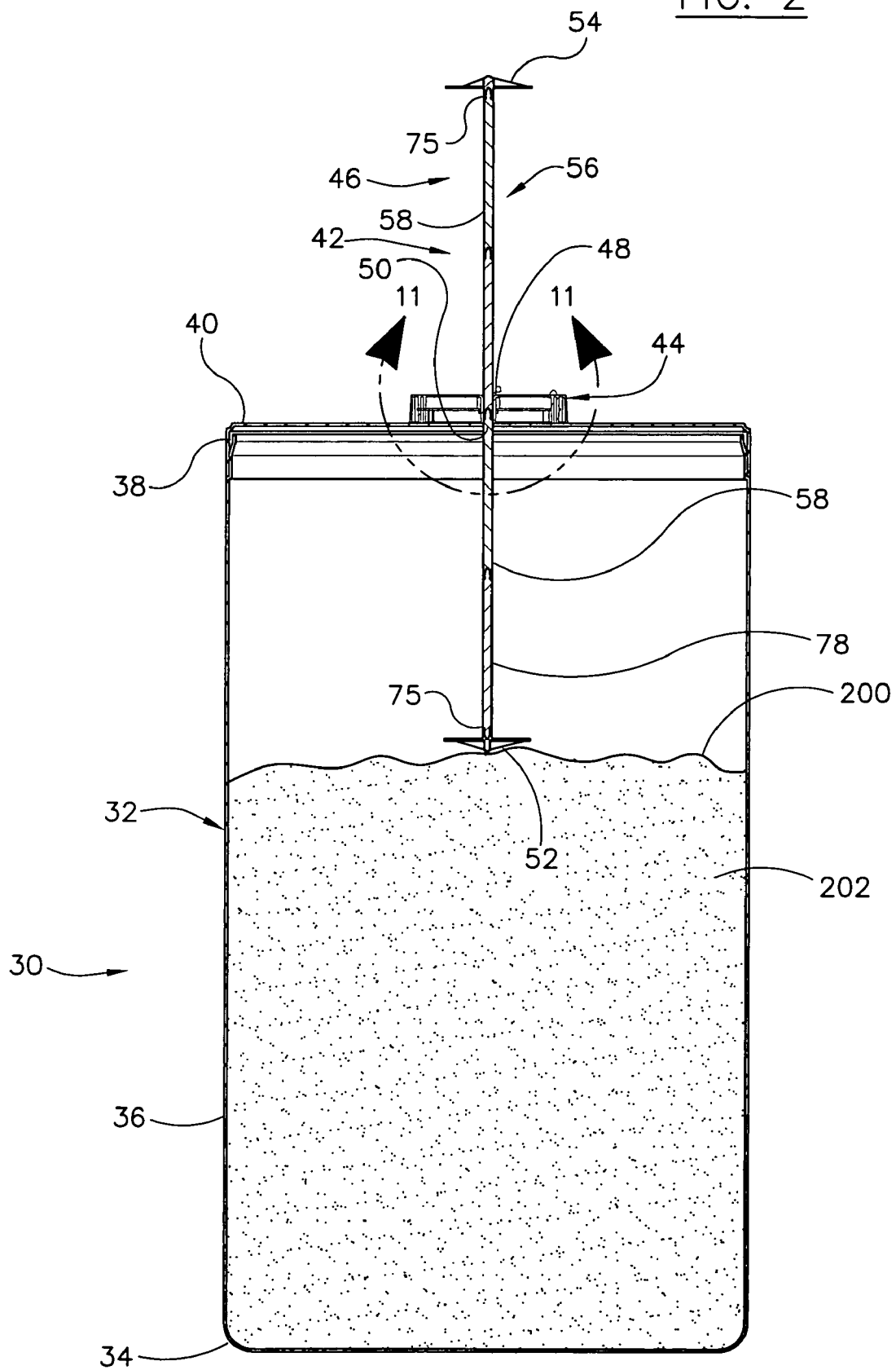
FIG. 2 is a cross-sectional view along line 2—2 of FIG. 1.
Figure 3:
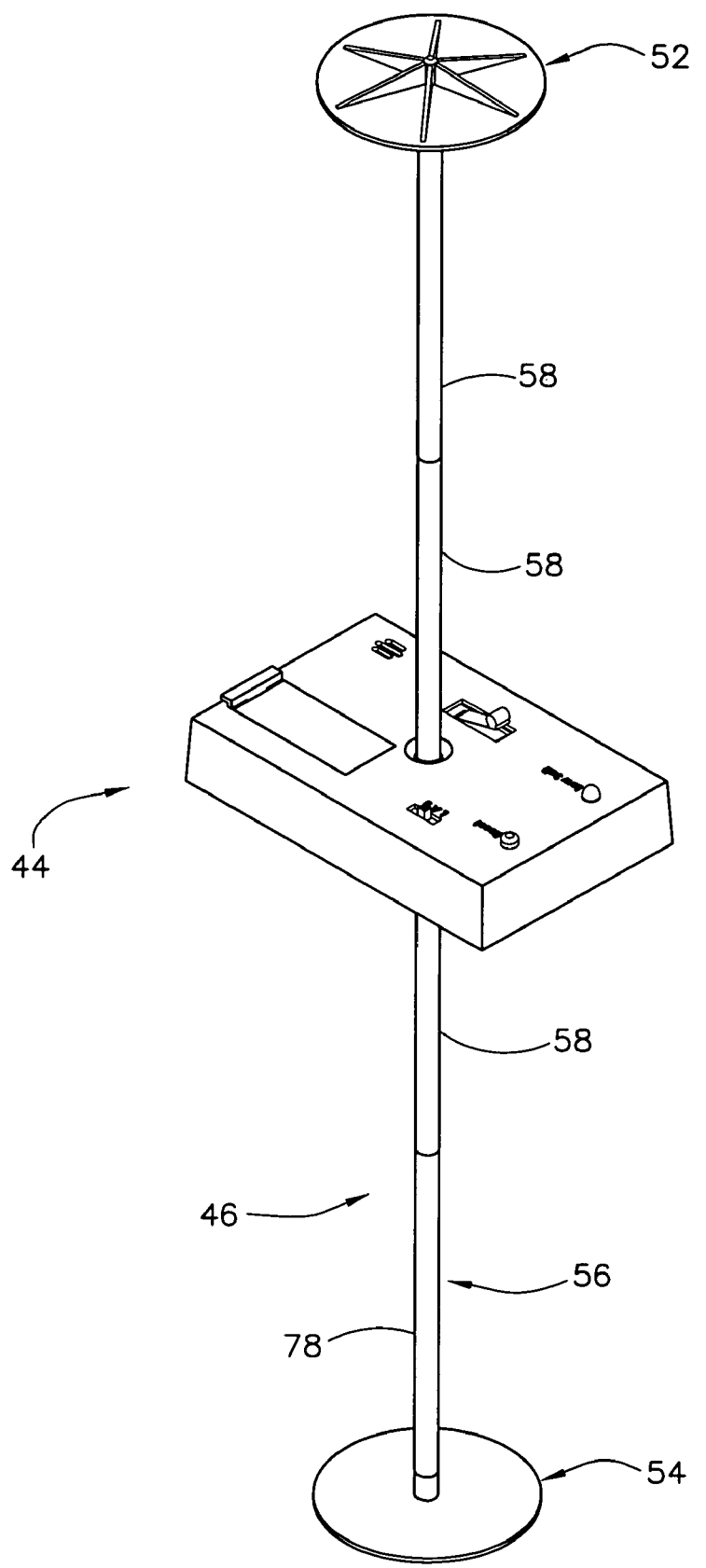
FIG. 3 is an isometric view of the monitoring device of FIG. 1.
Figure 4:
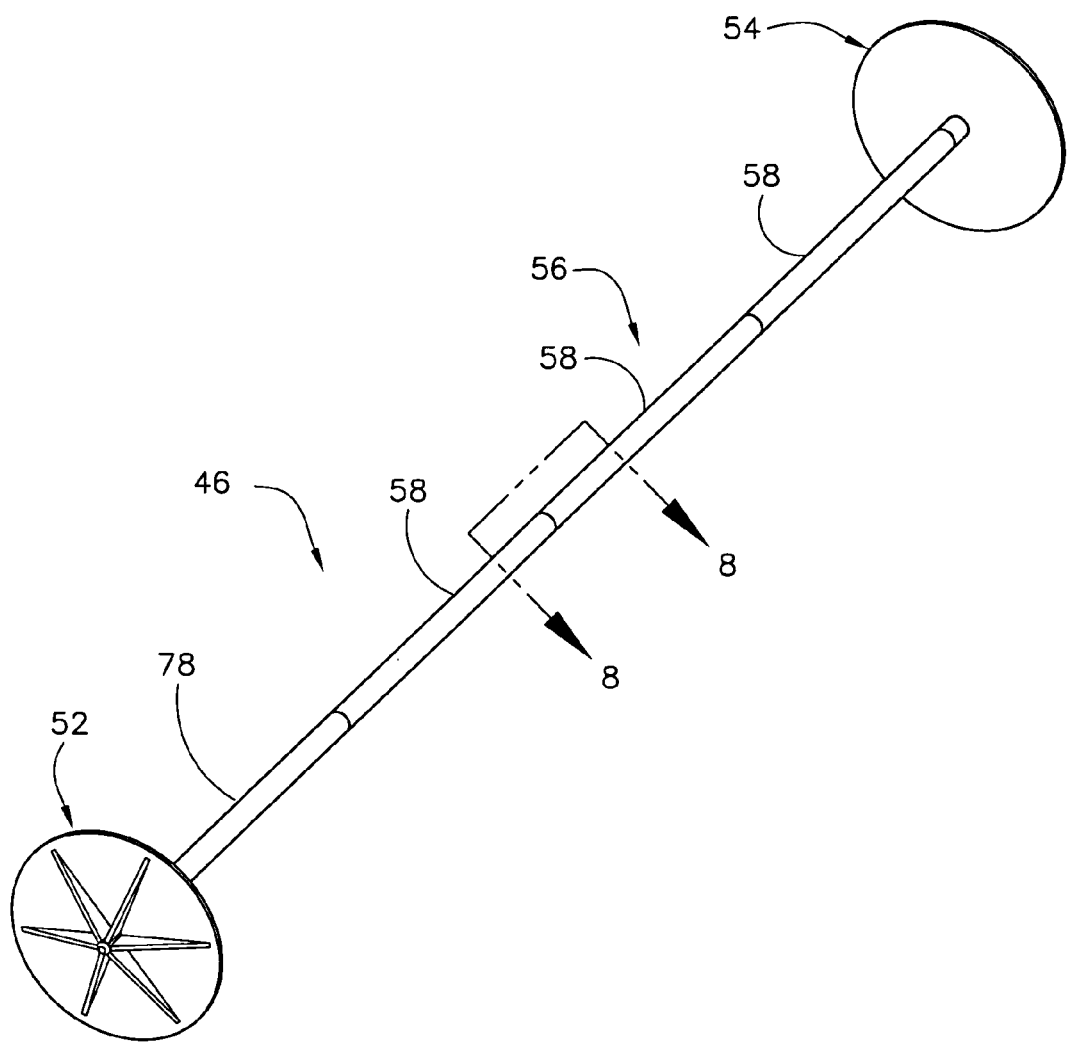
FIG. 4 is an isometric view of a direct detection mechanism of the device of FIG. 3.
Figure 5:
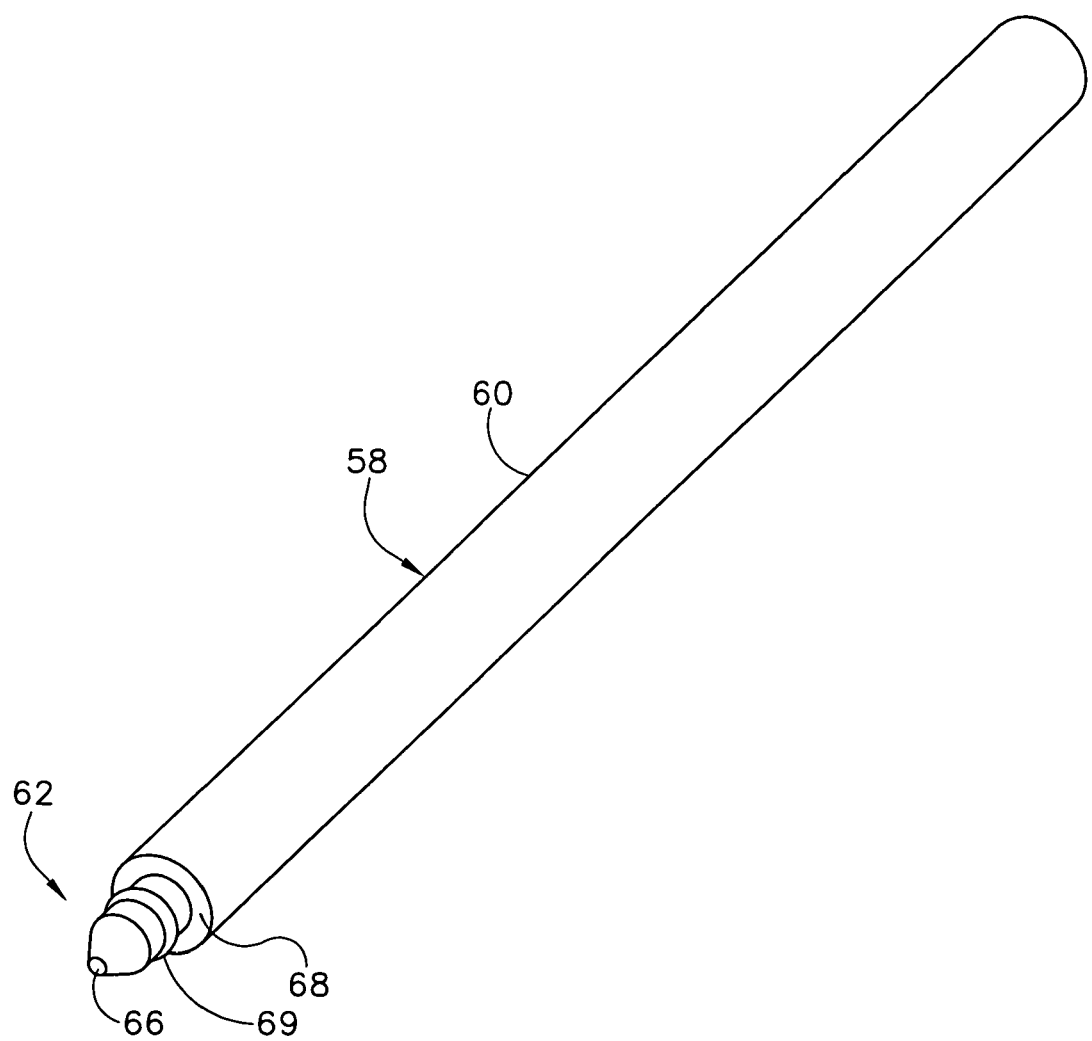
FIG. 5 is an isometric view of a first embodiment of a modular component of the direct detection mechanism of FIG. 4.
Figure 8:
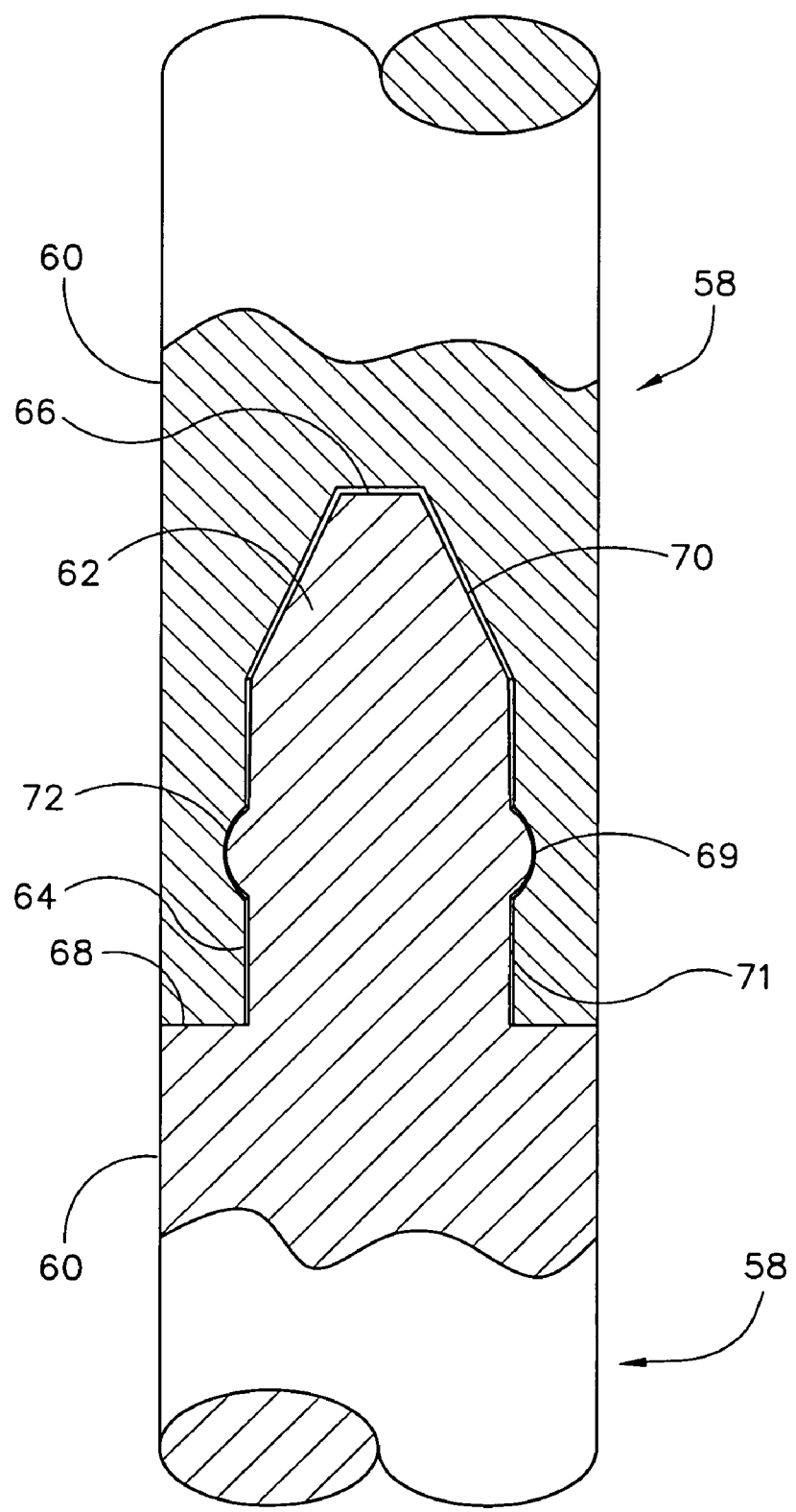
FIG. 8 is a cross-sectional view along line 8—8 of FIG. 4.
Figure 9:
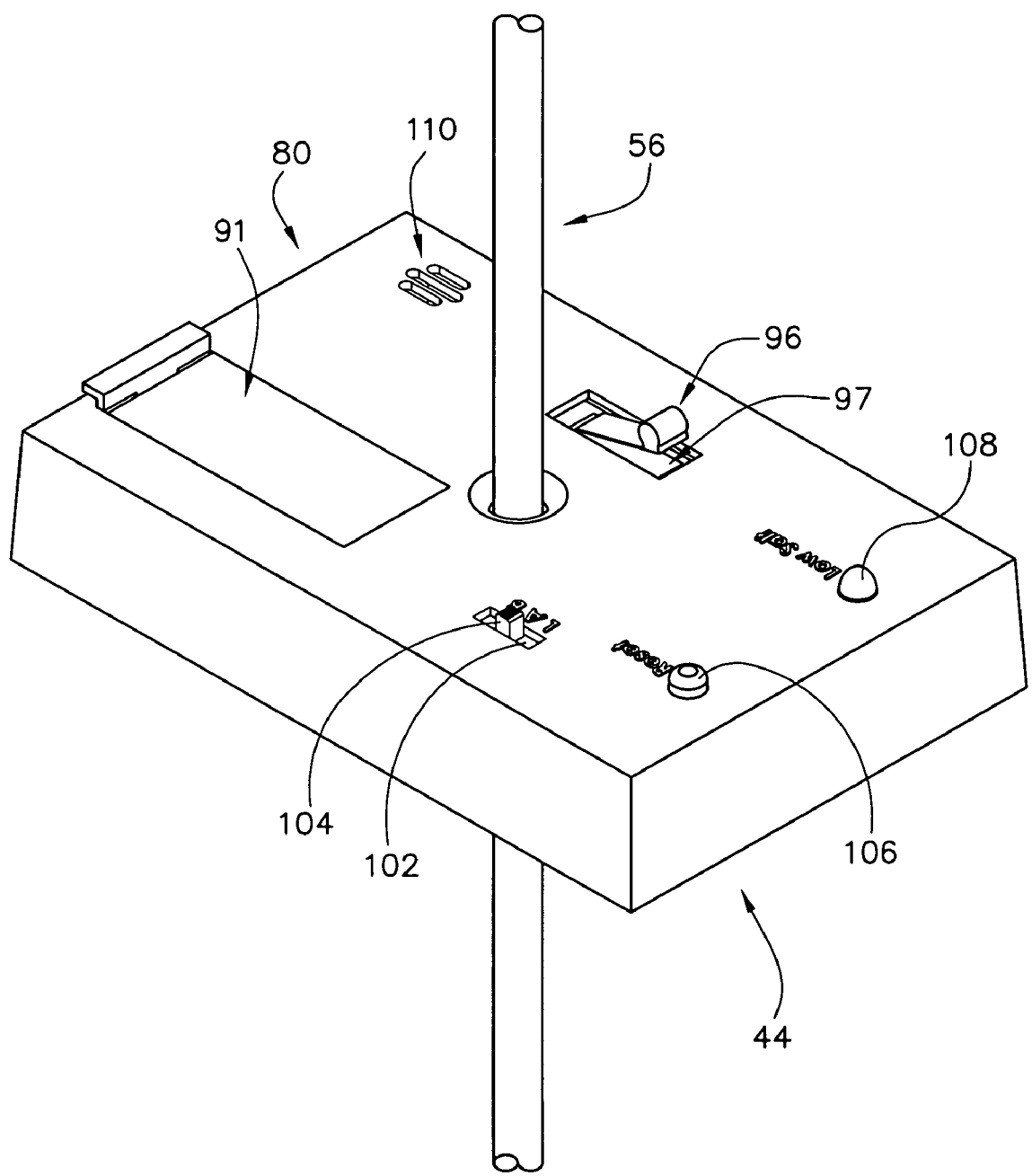
FIG. 9 is a partially broken away, isometric view of the sensor and direct detection mechanism of the monitoring device of FIG. 3.
Figure 10:
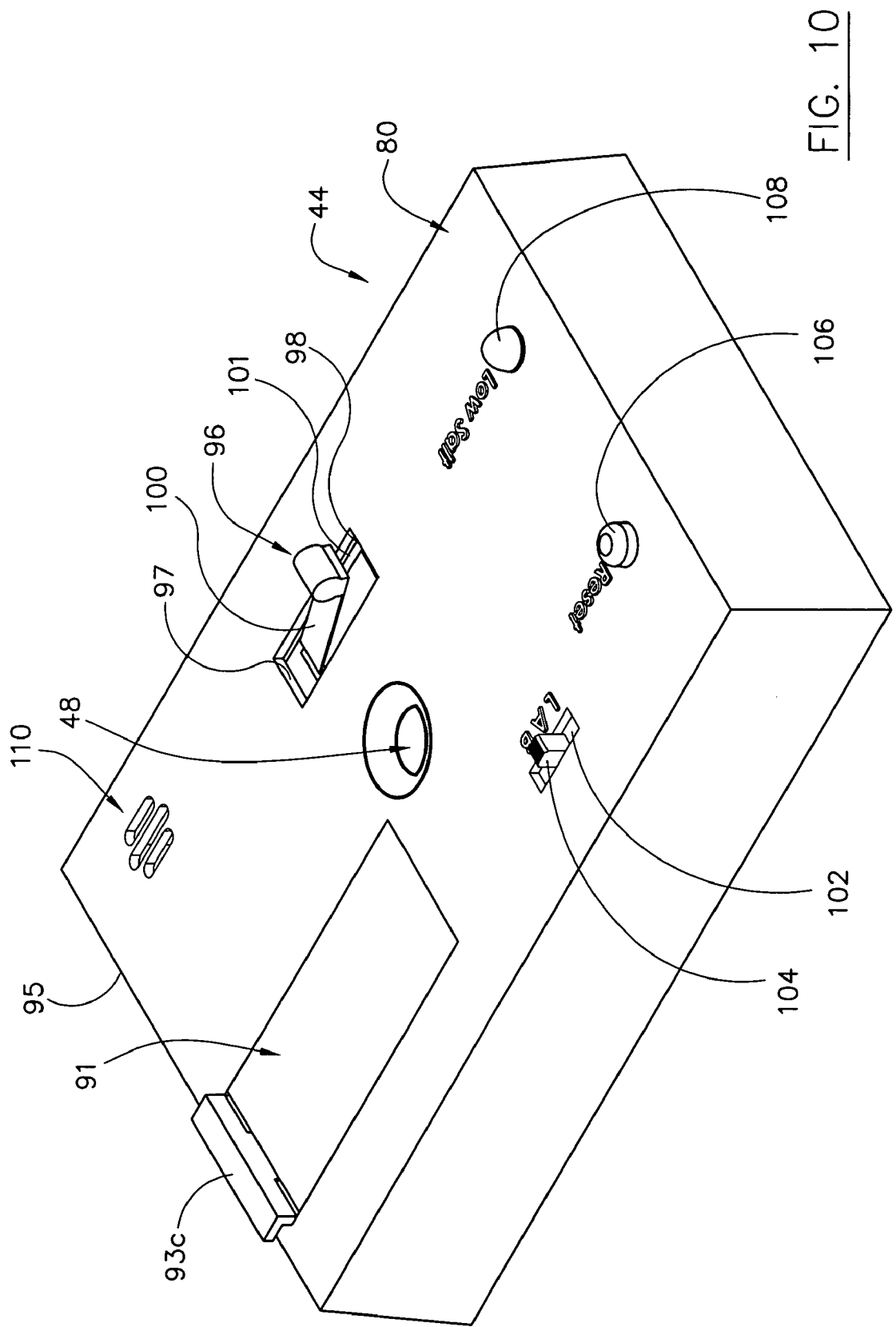
FIG. 10 is an isometric view of the sensor of the monitoring device of FIG. 9.
Figure 11:
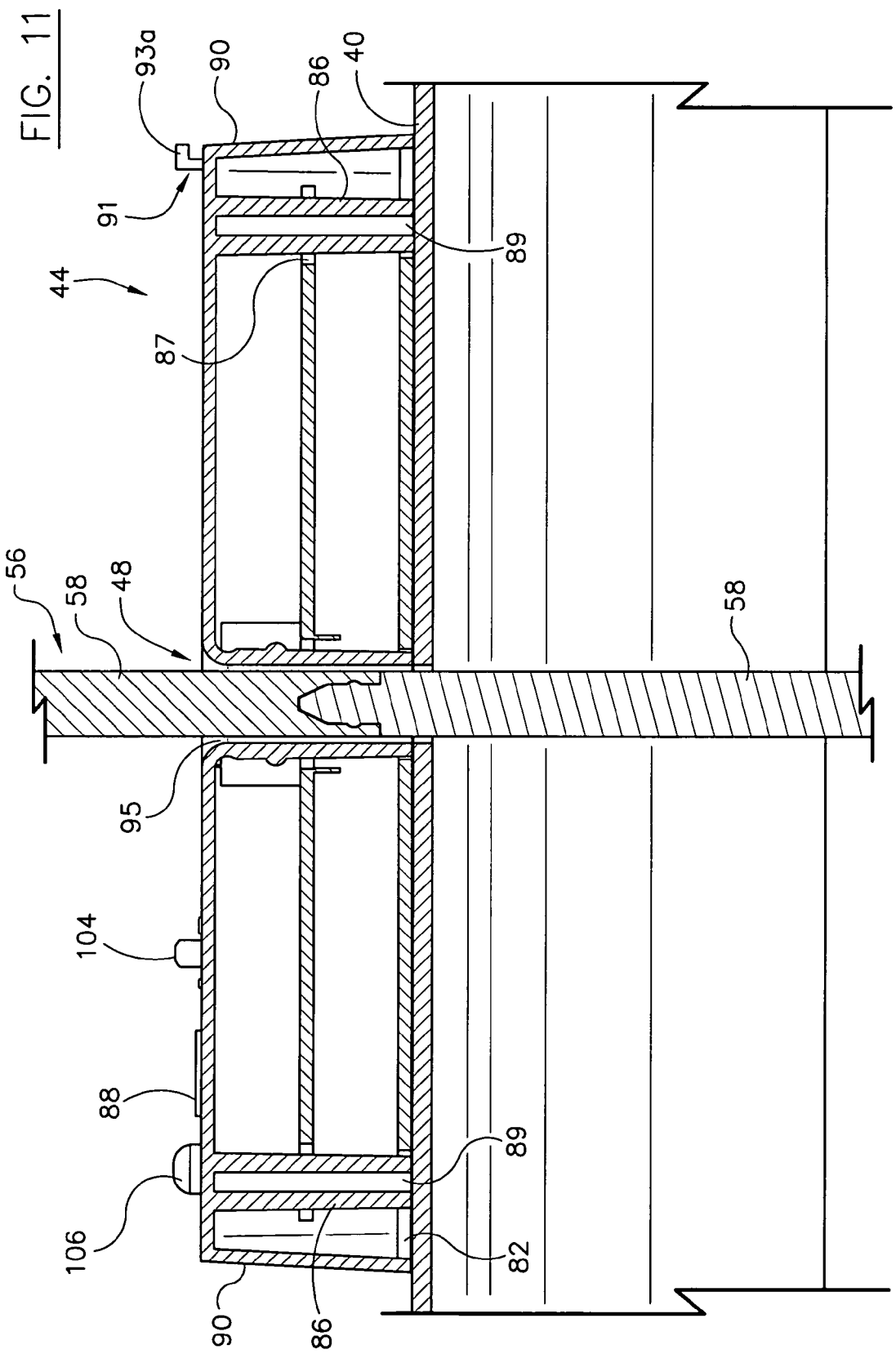
FIG. 11 is a circular cross-sectional view along line 11—11 of FIG. 2.

The central member 56 is adaptable for use with water softening tanks 30 having various sizes due to the construction of the central member 56 from a number of modular segments 58. As best shown in FIGS. 2, 5 and 8, each segment 58 includes a generally cylindrical body portion 60 that supports protruding attachment 62 at one end and a recess 64 at the opposite end. The attachment 62 has an outer end 66 spaced from the body portion 60 that is generally frustoconical in shape, and a cylindrical base 68 extending from the body portion 60 to the outer end 66. The base 68 also includes a peripheral flange 69 spaced between the outer end 66 and the body portion 60.

The recess 64 is shaped to be matingly engageable with the attachment 62, such that the recess 64 includes an inner tapered end 70, a cylindrical bore 71 and a peripheral notch 72 spaced from the tapered end 70. Consequently, when an attachment 62 on one body portion 60 is inserted into a recess 64 on an adjacent body portion 60, the respective body portion 60 are engaged with one another as best shown in FIG. 8. Any number of modular segments 58 can be joined in this matter to construct a central member 56 having the appropriate length for a given tank 30, allowing the detection mechanism 46 to be adapted for use with any size water softening tank 30. Further, in order to engage the lower member 52 and upper member 54 with the respective modular segments 58 on opposite ends of the central member 56, each of the lower member 52 and upper member 54 includes a hub 74 including a central sleeve 75 (FIG. 2) shaped identically to the recesses 64 and supported on the members by a number of spaced, triangular ribs 76, best shown in FIG. 7. Thus, each of the lower member 52 and upper 54 are adapted to receive and engage an attachment 62 on a modular segment 58 in the manner shown in FIG. 8.

Figure 6:
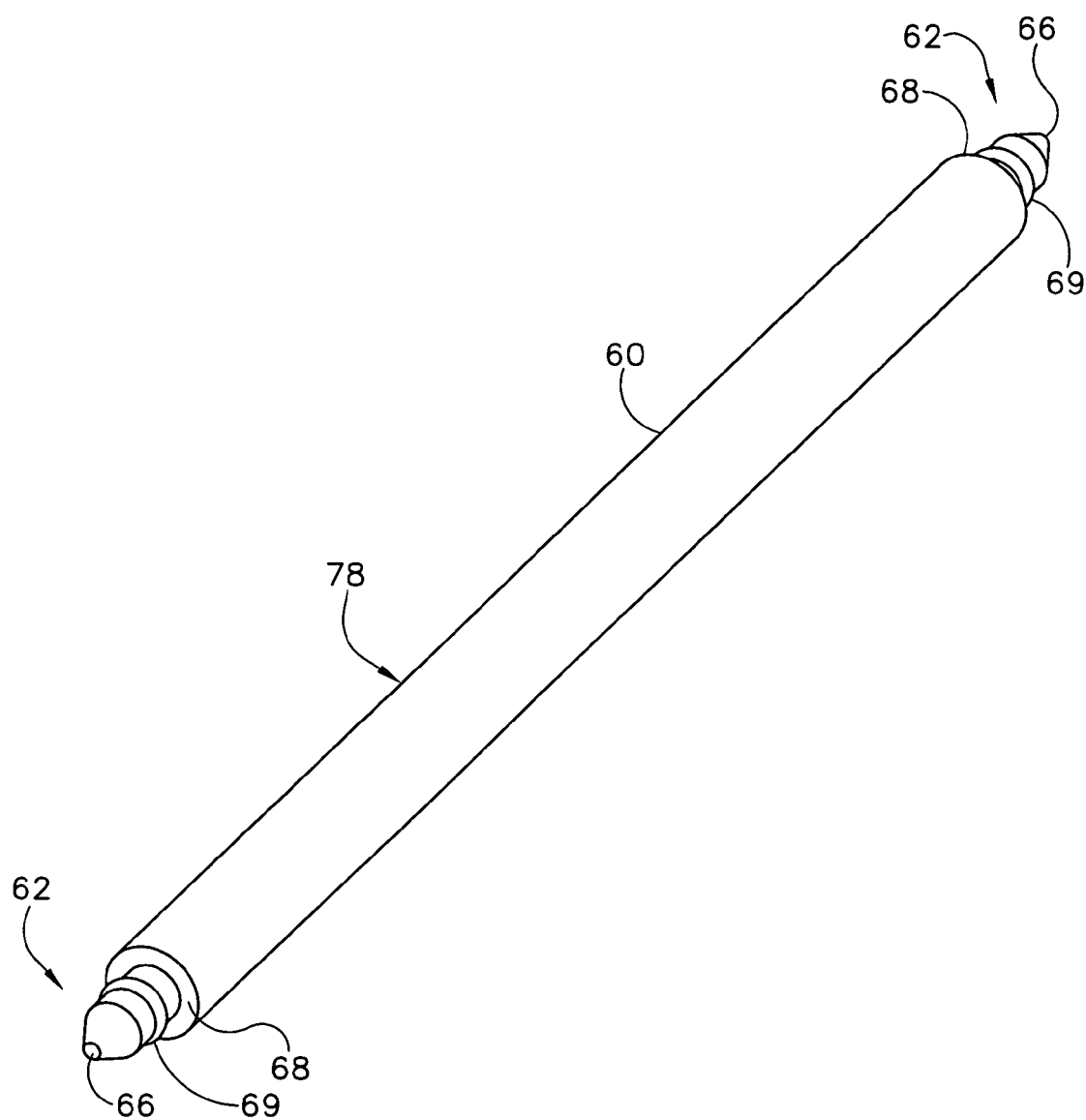
FIG. 6 is an isometric view of a second embodiment of a modular component of the direct detection mechanism of FIG. 4.
Figure 7:
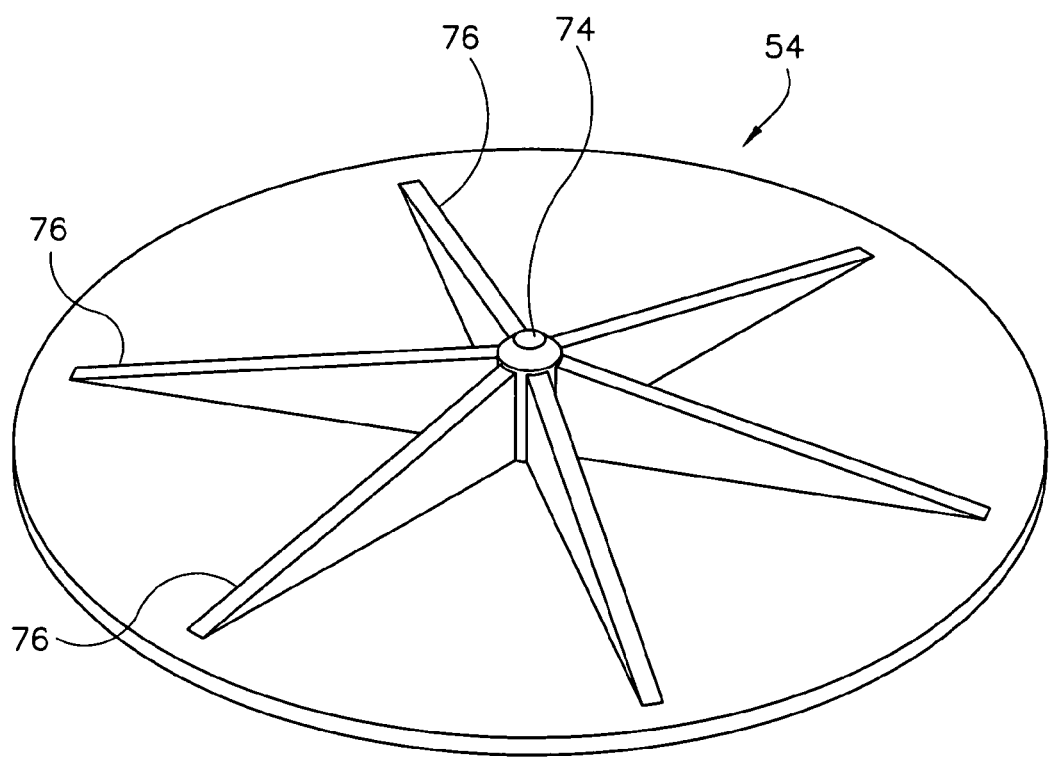
FIG. 7 is an isometric view of an end plate of the direct detection mechanism of FIG. 4.

As one end of each segment 58 has a recess 64, in order to enable one of the lower member 52 or the upper member 54 to be secured to the central member 56, an end segment 78, best shown in FIG. 6, is also used to form the central member 56. The end segment 78 is formed similar to the segments 58 with the exception of a second attachment 62 positioned on one end of the end segment 78 where the recess 64 is located on a segment 58, such that the end segment 78 can engage both the sleeve 75 in one of the lower member 52 or upper member 54 and the recess 64 in the adjacent modular segment 58.

Figure 12:
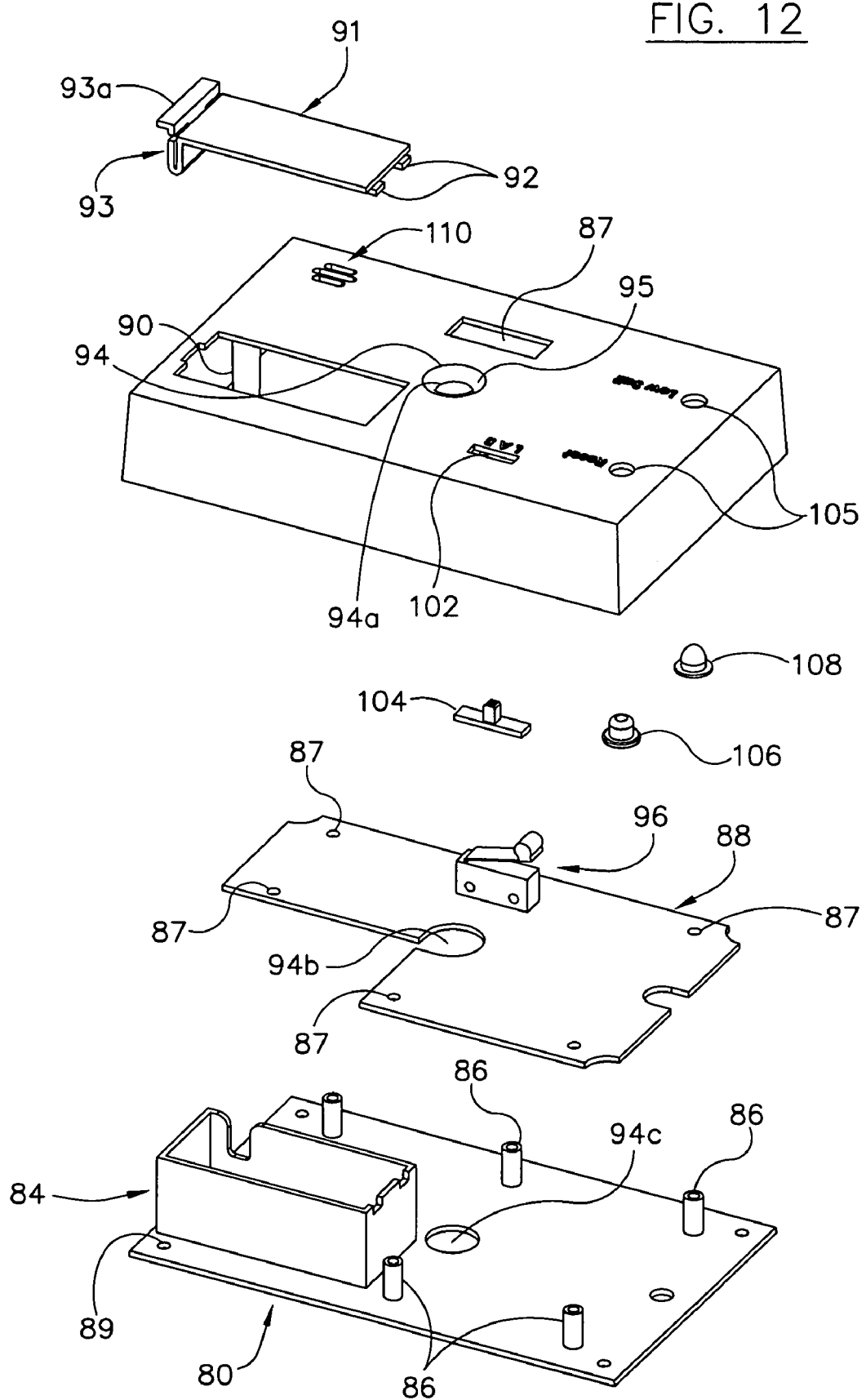
FIG. 12 is an exploded isometric view of the sensor of FIG. 10.
Figure 13:
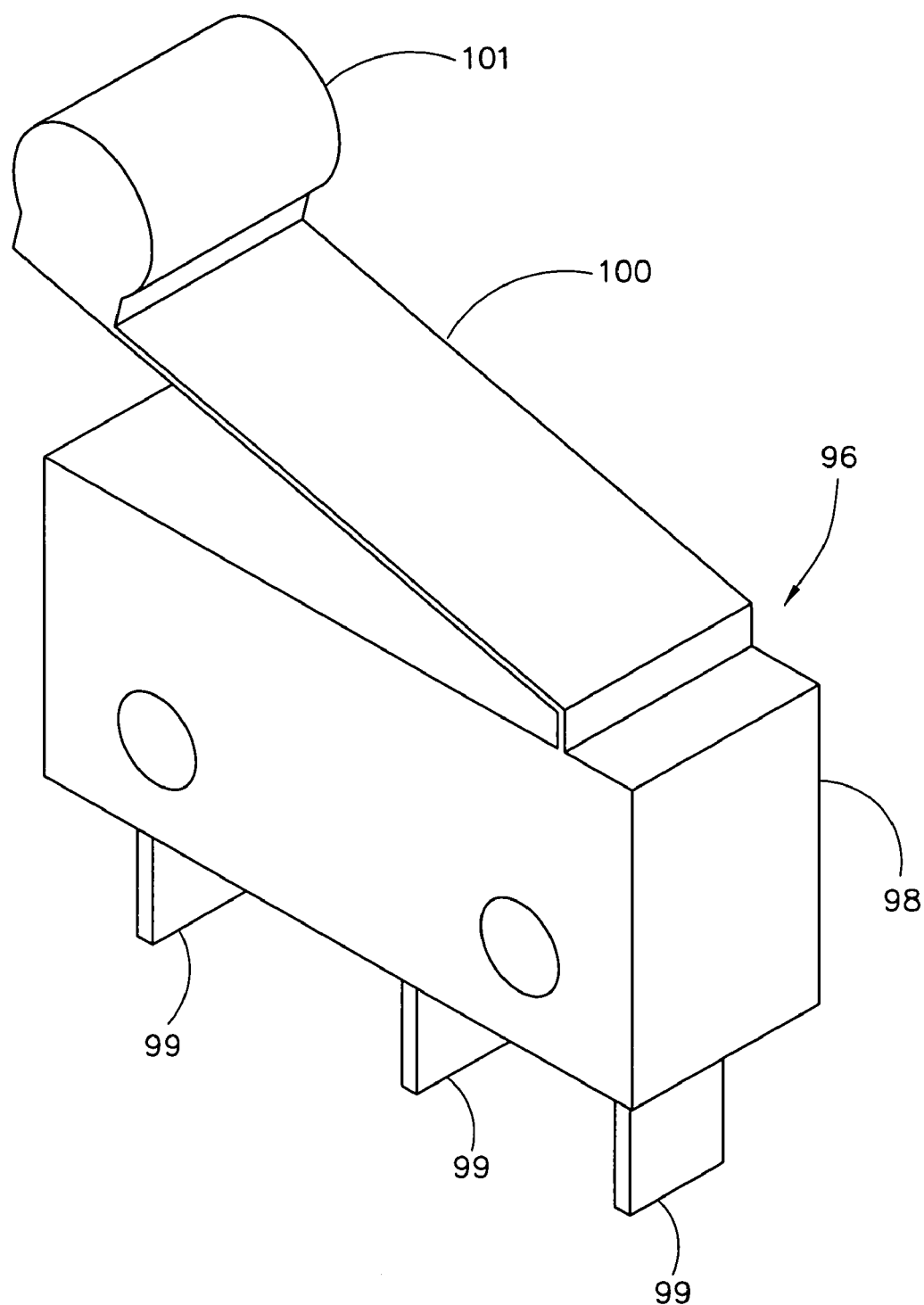
FIG. 13 is an isometric view of a limit switch of the sensor of FIG. 12.

Referring now to FIGS. 9–13, the sensor 44 through which the detection mechanism 46 extends is illustrated as including a generally rectangular housing 80 that is fixed to the cover 40. As best shown in FIG. 12, the housing 80 is secured to a base 82 having a power source receptacle 84, for receiving a battery (not shown) and a number of mounting stems 86 thereon. Alternatively, the base 82 can include a plug and cord (not shown) engageable with a conventional electrical outlet (not shown). A circuit plate 88 capable of supporting or having circuitry (not shown) printed thereon is positioned around the receptacle 84 and mounted to the stems 86 opposite the base 82 using suitable fasteners (not shown) inserted through openings 87 in the plate 88 to allow the plate 88 to form the necessary electrical connections between the various components of the sensor 44. The housing 80 is fixed to the base 82 over the circuit plate 88 using fasteners (not shown) inserted through openings 89 in the base 82 and engaged with mounting channels 90 on the housing 80 aligned with the openings 89. The housing 80 also includes a removable panel 91 having a pair of tabs 92 at one end and a biased lock 93 with a handle 93a at the opposite end that are engageable with opposed ends of an opening 94 in the housing 80 to selectably expose the power source receptacle 84 in order to enable a replaceable power source, such as a battery (not shown), to be connected to the sensor 44 in any conventional manner and positioned and retained within the receptacle 84. The housing 80, base 82, and circuit plate 88 also each include a central aperture 94a, 94b and 94c, respectively, that are aligned with one another to form the opening 48 through which the central member 56 of the detection mechanism 46 extends. The aperture 94a in the housing 80 can also include a flexible skirt 95 extending into the aperture 94a around the central member 56 to prevent material from passing through the opening 48 and around the central member 56 into the tank 30.

The power source within the receptacle 84 is connected via the circuit plate 88 to a limit switch 96 fixed to the circuit plate 88 and extending outwardly through a first slot 97 in the housing 80. The switch 96 includes a base 98 secured by prongs 99 to the circuit plate 88 and a biased arm 100 extending outwardly from the base 98 through the slot 97 and supporting a stop 101 opposite the base 98. The housing 80 also includes a second slot 102 that is spaced from the first slot 97 in which is disposed an operating switch 104 connected to the plate 88 and used to selectively change the operating mode of the sensor 44, i.e., to select light only, alarm only, or both. The housing 80 also includes additional openings 105 for a reset button 106, an indicator lamp 108, and an audible alarm device 110 (e.g., a speaker) which are all connected to the plate 88 and allow the sensor 44 to provide visible and/or audible signals when a signal from the limit switch 96 is received by the sensor 44. Note: power is always on as long as a battery is installed, like a smoke alarm. However, the alarm may also sound when battery power is low in the sensor.

More specifically, in operation, once an amount of salt 202 has been placed within the body 32 of the tank 30, the cover 40 and monitoring device 42 are positioned over the body 32. The lower member 52 of the detection mechanism 46 is positioned on the upper level 200 of the salt 202. As the water softening system operates, the upper level 200 of the salt 202 within the tank 30 is lowered, thereby allowing the lower member 52 and detection mechanism 46 to slide downwardly with respect to the sensor 44. When the upper salt level 200 has reached a predetermined lower limit based on the length of the central member 56, the detection mechanism 46 is positioned with respect to the tank 30 such that the upper member 54 contacts and depresses the stop 101 and the arm 100 of the limit switch 96. The depressing of the arm 100 sends a signal from the switch 97 to the plate 88 that serves to operate the sensor 44 to emit a visual signal using the indicator lamp 108 and/or an audible signal using the speaker 110 to alert an individual to the low level of salt present within the tank 30. As will be more fully described below, the alarm indicator may be located at a position closer to the individual's living area but remote from the location of the sensor and the softener, for example, in the basement.

Figure 14:
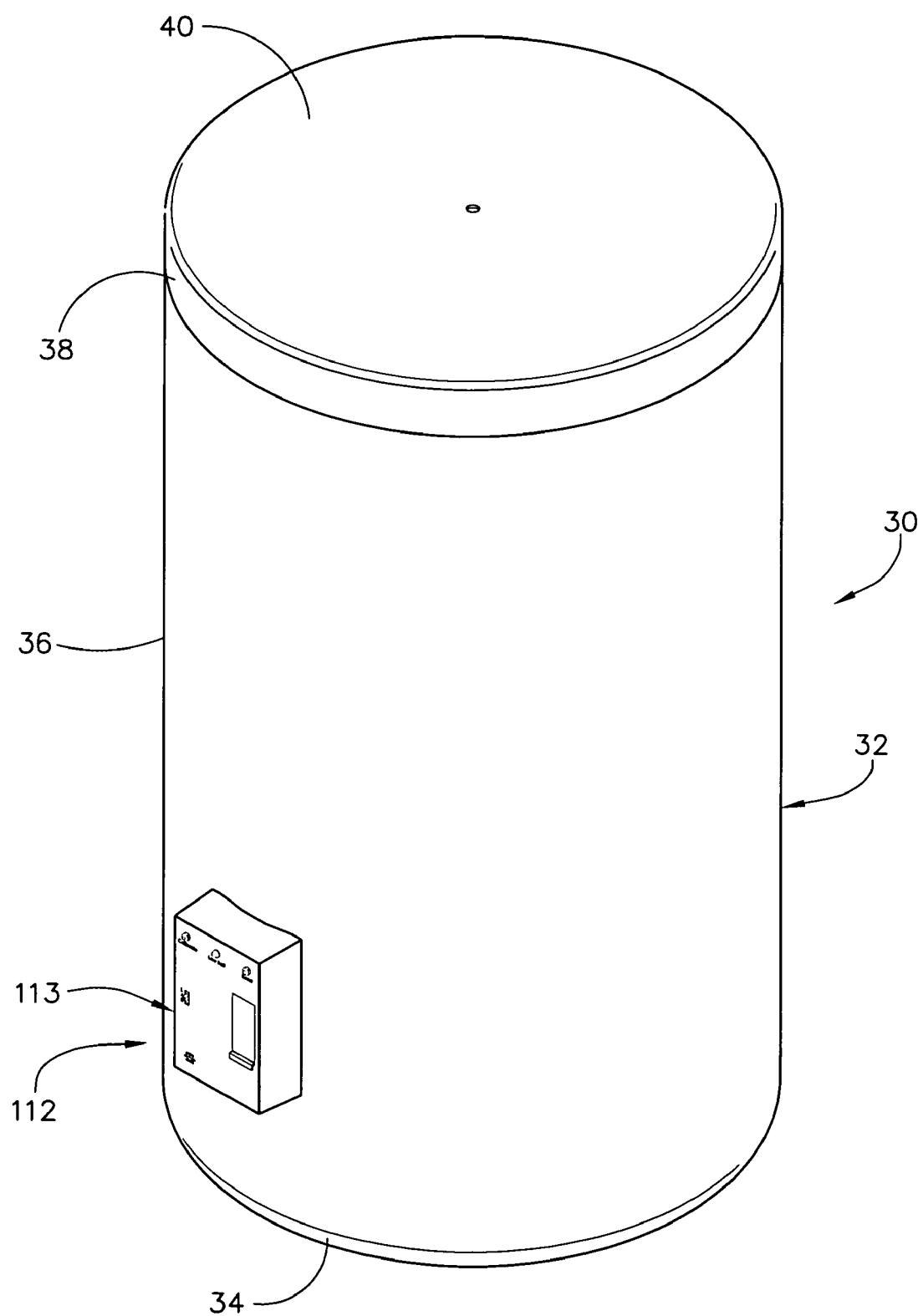
FIG. 14 is an isometric view of a water softener tank and a second embodiment of the monitoring device of the present invention.
Figure 15:
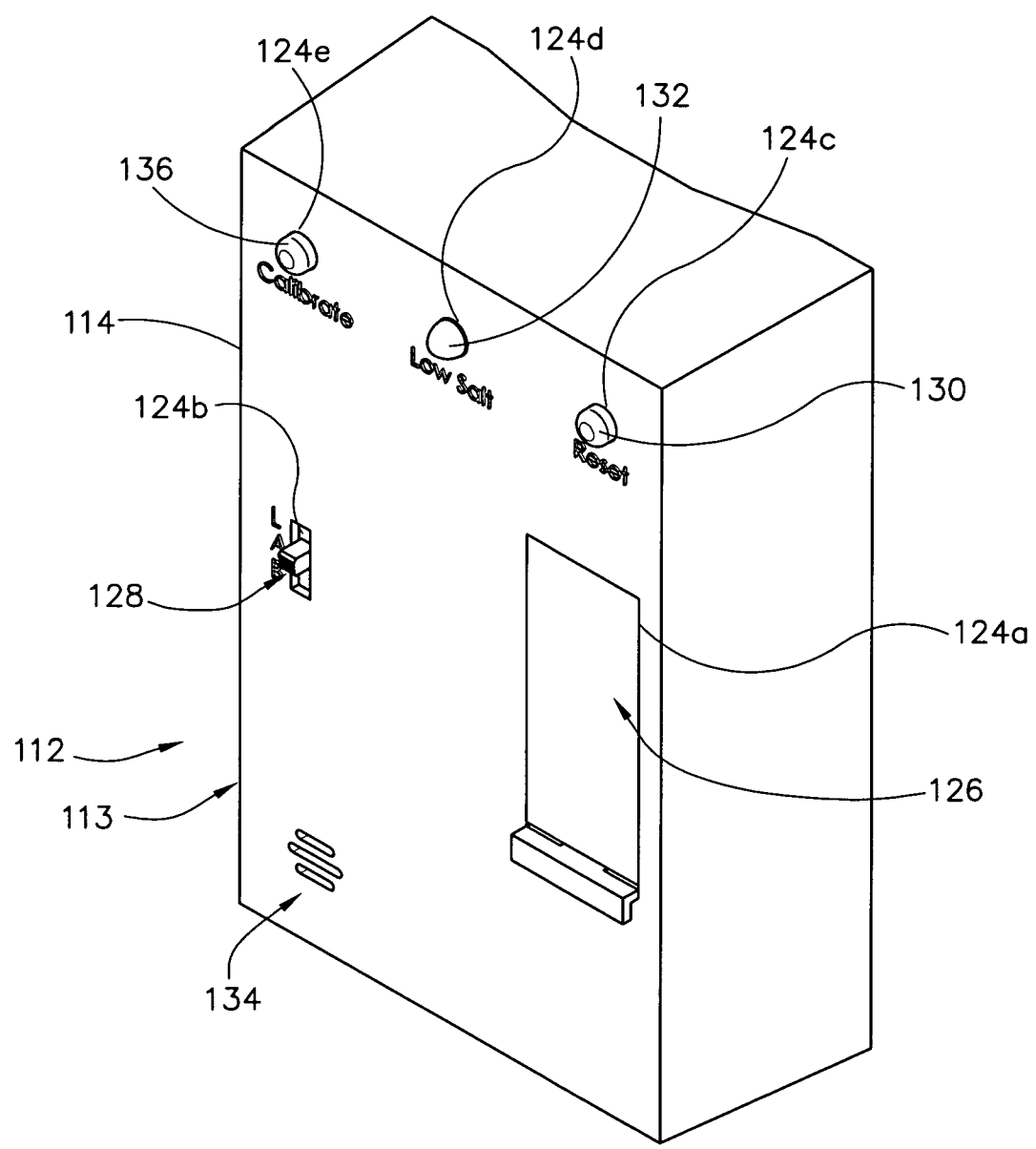
FIG. 15 is an isometric view of the sensor of the monitoring device of FIG. 14.
Figure 16:
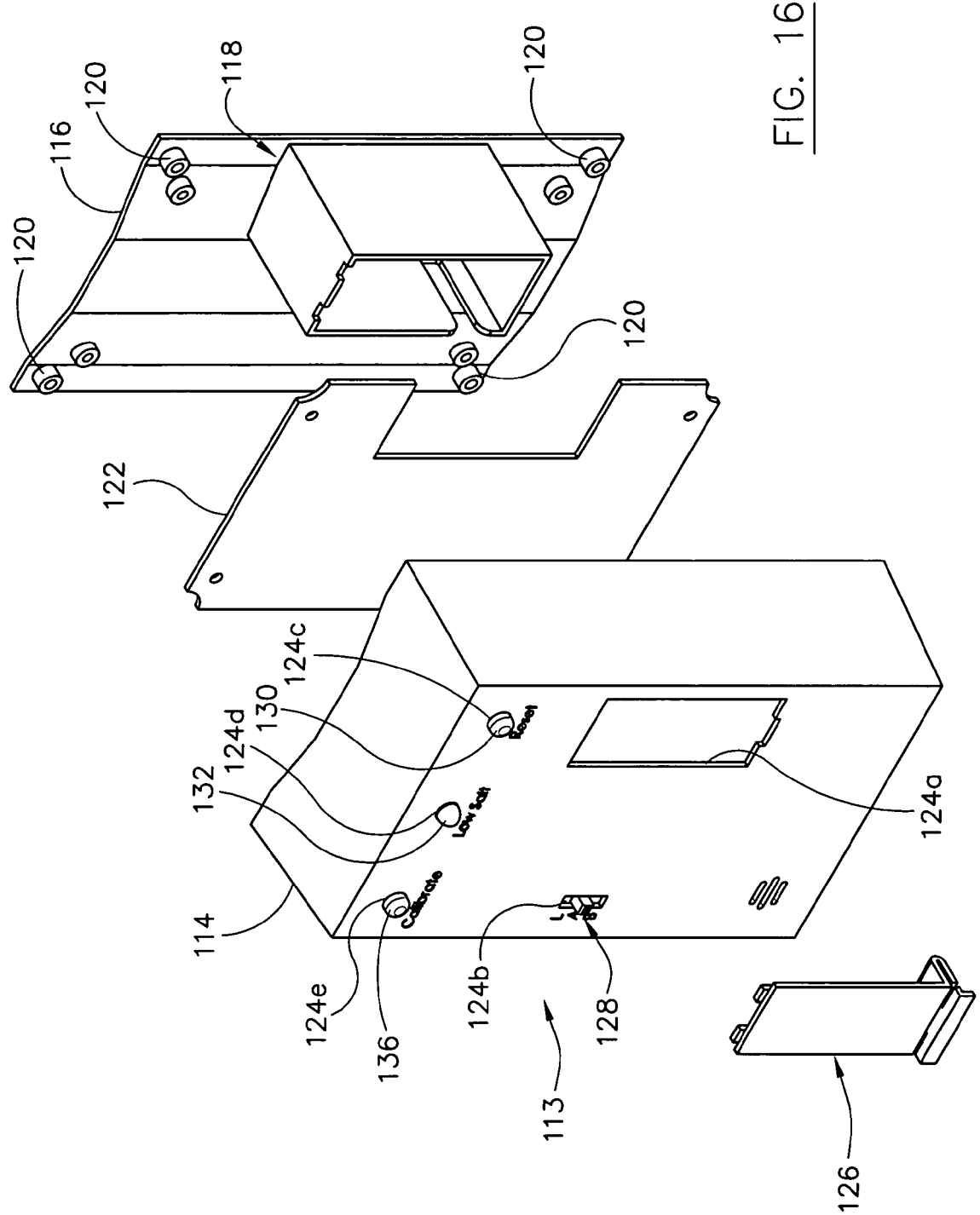
FIG. 16 is an exploded, isometric view of the monitoring device of FIG. 15.

Referring now to FIGS. 14–16, in a second embodiment of the present invention, a monitoring device 112 includes a sensor 113 mounted to the sidewall 36 of the body 32 of the tank 30 adjacent the lower end 34. The sensor 113 is formed similarly to the sensor 44 and includes a housing 114 secured to a base 116 including a power source receptacle 118 and a number of mounting stems 120 over a circuit plate 122 secured to the mounting stems 120 around the receptacle 118. The housing 114 is affixed to the base 116 in a conventional manner similar to that discussed previously and includes openings 124a–124d in which are located a removable panel 126, an operating switch 128, a reset button 130, and an indicator lamp 132, as well as a speaker 134, similarly to the housing 80.

However, the monitoring device 112 does not include a direct detection mechanism 46 as in the previous embodiment, but performs the monitoring function utilizing an indirect detection mechanism (not shown). The indirect mechanism utilized by the device 112 is a mechanism that is constructed and functions similarly to that shown in Heger U.S. Pat. No. 6,023,159, which is herein incorporated by reference. Specifically, in this mechanism, the sensor 113 includes a capacitor plate (not shown) and a ground plate (not shown) disposed on or adjacent the base 116 near the sidewall 36 of the tank 30. The plate senses the capacitance of the material within the tank 30 immediately adjacent the device 112 and compares this capacitance value to a reference value stored within the device 112. The reference value is a value corresponding to a condition where the upper level 200 of salt 202 within the tank 30 has reached a lower limit approximately just beneath the level of the device 112. The reference value is determined and stored in any suitable manner within the device 112 by positioning the device 112 against the tank 30 either prior to the addition of salt to the tank 30 or above the upper level 200 of the salt 202 within the tank 30 and sensing the capacitance of the tank 30 without any salt 202 adjacent the device 112 by depressing a calibrate button 136 disposed on the housing 114 in an opening 124e. The device 112 can also effectively monitor the upper level 200 of the salt 202 within the tank 30 at preselected intervals utilizing a timer (not shown) located within the device 112 and connected to the indirect detection mechanism to selectively operate the detection mechanism at the end of each interval measured by the timer.

When the device 112 determines the salt level in the tank 30, the capacitance of the material within the tank 30 is measured by the detection mechanism, and this actual capacitance value is compared with the calibration or reference value stored in the device 112. If the actual capacitance value is a predetermined percentage above the reference value, the device 112 can retest for the actual capacitance value to provide an assurance factor in the accuracy of actual value obtained by the device 112, and/or can initiate the timer to countdown another interval prior to a subsequent test. However, if the actual capacitance value determined is equal to or above the reference value, the device 112 can initiate an audible and/or visual alarm utilizing the speaker 134 and lamp 132 on the housing 114. For example, two formulas are instructive for illustrating at least this embodiment and method. The first formula is for calibrating the unit at the point the unit is attached with salt covering the point of attachment. In terms of determining the level of salt in the tank, one method preferably uses software to look at the difference between a reference value and an actual value. The reference value is determined by the previously described calibration, at the point where the unit is attached, with the tank filled, or at least with salt above the level at where the unit is attached. That value is stored in the unit. If the actual value is a predetermined percentage, (e.g.10%) greater than the reference value, the unit will notify the user of the low salt condition. Thus, the formula for this operation can be represented as follows:

Notify If: Actual Value>(Reference Value+(Reference Value×10%))

The second formula can be for calibrating the unit over an empty spot on the tank or when the salt is below the level that the unit is attached. The unit can also be configured to be calibrated over an empty tank. In this method, if the actual value is less than a predetermined percentage, (e.g. 10%) greater than the reference value, the unit will notify the user of the low salt condition. Thus, the formula for this operation can be represented as follows:

Notify If: Actual Value<(Reference Value+(Reference Value×10%))

Figure 17:
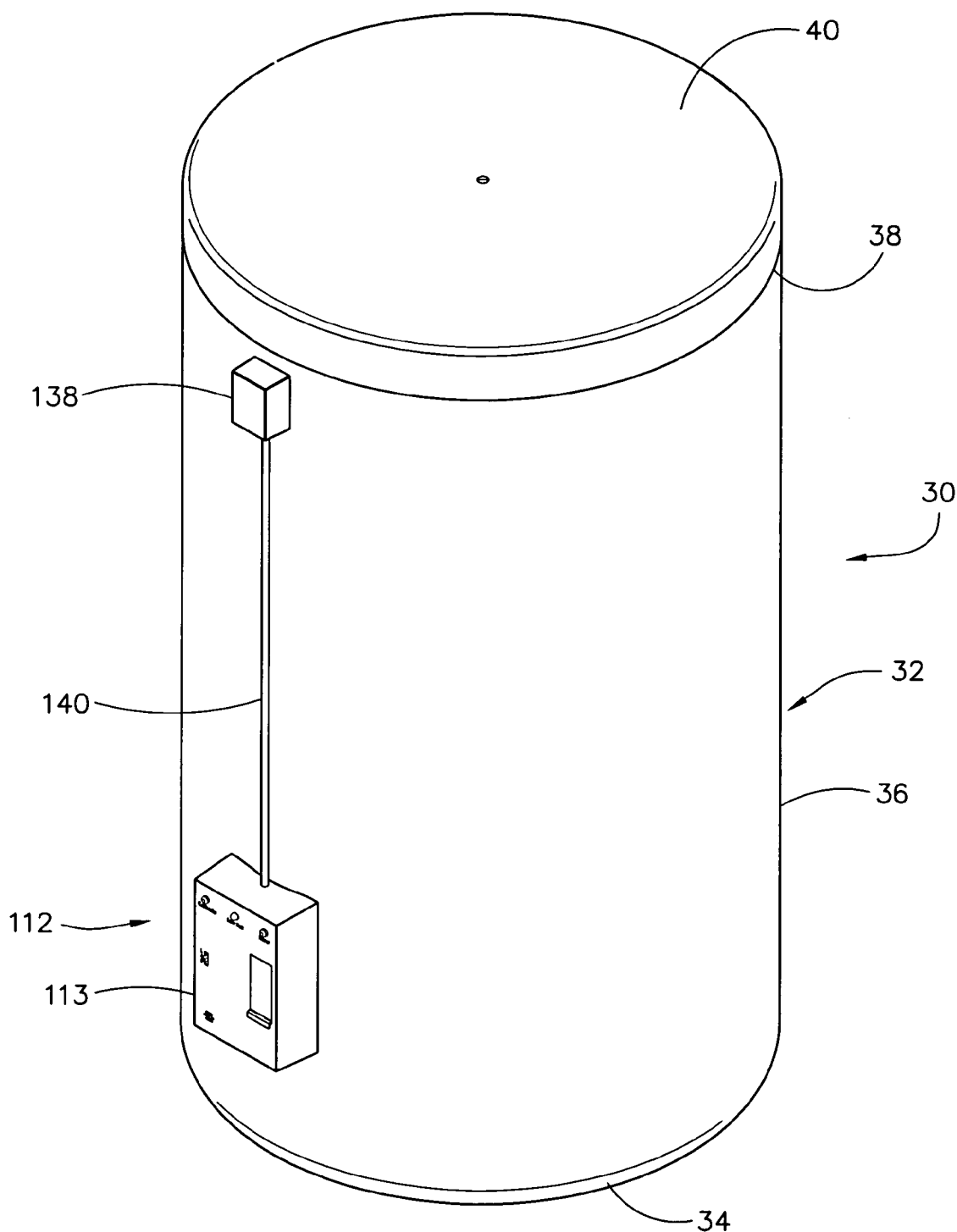
FIG. 17 is an isometric view of a third embodiment of the monitoring device of the present invention.

In an alternative construction to the embodiment of the device 112 shown in FIG. 17, the device 112 can incorporate a dedicated reference capacitance value device 138 that is fixed to the sidewall 36 of the tank 30 adjacent the upper end 38. The device 138 is constructed and operates identically to the device 112 and is positioned to enable the device 138 to continually obtain a capacitance value for the tank 30 at a location where no salt is present within the tank 30. Once obtained, the device 138 can transmit this value to the monitoring device 112 via a conduit 140, or other suitable wire or wireless connection, in order to continually supply and/or update the reference value used by the monitoring device 112. Further, in addition to sensing a capacitance value based on the presence of solid or granular salt within the tank 30, the device 112 can be configured to be capable of sensing a capacitance value based upon the concentration of ions within the brine solution held in the tank 30 as a result of dissolved salt to provide an indication of salt within the tank 30. Once the salt is depleted, the brine solution lowers in the tank and the unit will sense the absence at the attachment point.

As shown in FIG. 17a, in lieu of the capacitor connected by a cable, the base circuit 122 of the device 112 will have two capacitation plates 113a,b and one ground plate 113c. The plates preferably are the same size.

Further, in addition to sensing a capacitance value based on the presence of solid or granular salt within the tank 30, the device 112 can be configured to be capable of sensing the level of the brine solution through an inductance sensor. The sensor can be configured to that shown in FIG. 17a. When salt is dissolved in the water in the tank to form the brine solution, the solution is capable of being sensed through an inductance sensing circuit, similar to those used in metal detectors. This is particular effective when salt blocks are used in lieu of granular material. The blocks generally are placed further away from the wall of the tank 30 than granular materials, that sensing through capacitance is less effective. The salt blocks however displace fluid raising the upper level of the brine solution. When the salt blocks are depleted, the level lowers a measurable amount. By placing the inductance sensor on the outside of the tank 30 between the upper level of the brine solution when the salt is added, and the level the it drops to when the salt is depleted, you can sense the absence of salt when the level drops, through the inductance circuit and notify of the low salt condition. The unit can also be placed at a level low enough on the tank so that it is always over the lowest level of brine solution/water. This is beneficial to the user who then doesn't have to know where the upper and lower limits are. In this case, the unit would sense when the salt is completely depleted and a brine solution is no longer present, only water. The unit would sense this through the inductance circuit and notify of the no salt condition.

Also, in addition to sensing the capacitance of the tank 30 in order to determine an amount of salt within the tank 30, the device 112 can utilize an indirect detection mechanism that employs an electromagnetic wave emitter (not shown) as disclosed in McEwan U.S. Pat. No. 5,512,834, which is herein incorporated by reference. Specifically, the emitter sends out waves of low frequency electromagnetic radiation (radio waves) into the tank 30, which bounce off of the salt within the tank 30 for reflection back to a wave detector (not shown) in the device 112. The angle of reflection of the waves to the device 112, and the duration of time for the waves to be emitted and reflected back to the device 112 can be used by the detector to determine the amount of salt within the tank 30. If the amount or level is below a lower limit, the device 112 can activate an audible or visible alarm, as described previously. Also, in this embodiment of the indirect detection mechanism, the sensor 113 can be positioned anywhere on the tank 30 or cover 40, so long as the mechanism is properly calibrated for the position it is in, in a known manner.

In another embodiment, if the tank 30 is made of a plastic that IR signals can pass through, an infrared (IR) emitter may be placed on one side of the tank and an infrared receiver may be placed on the other side of the tank at a predetermined level. The salt or brine solution blocks the infrared signal from passing to the receiver. Once the salt or brine level falls below the level at which the emitter and receiver are attached, the signal can be received actuating the alarm. Preferably, the emitter and receiver are connected via a cable (not shown).

Figure 18:
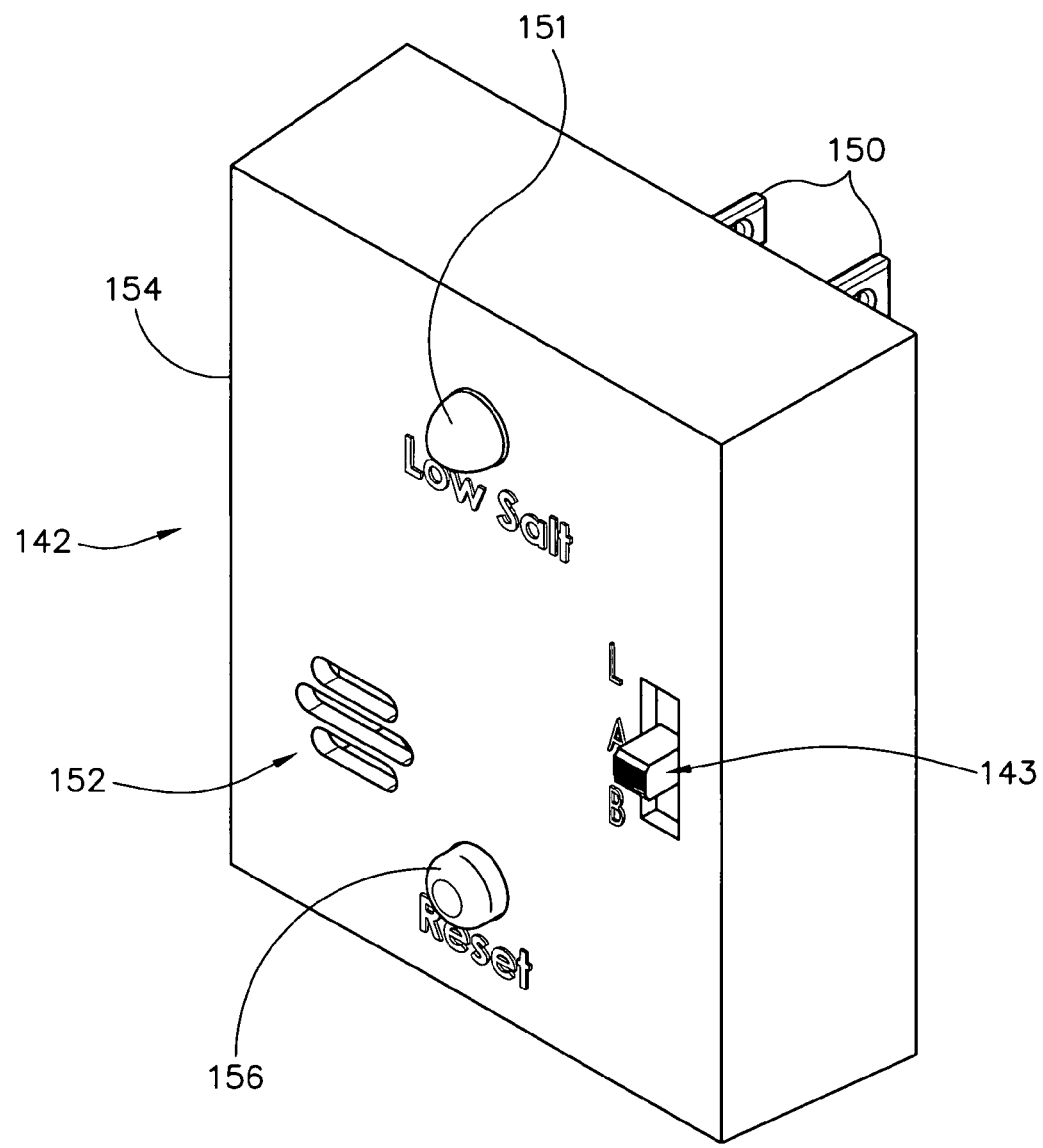
FIG. 18 is an isometric view of an alarm mechanism utilized with the monitoring device of the present invention.
Figure 19:
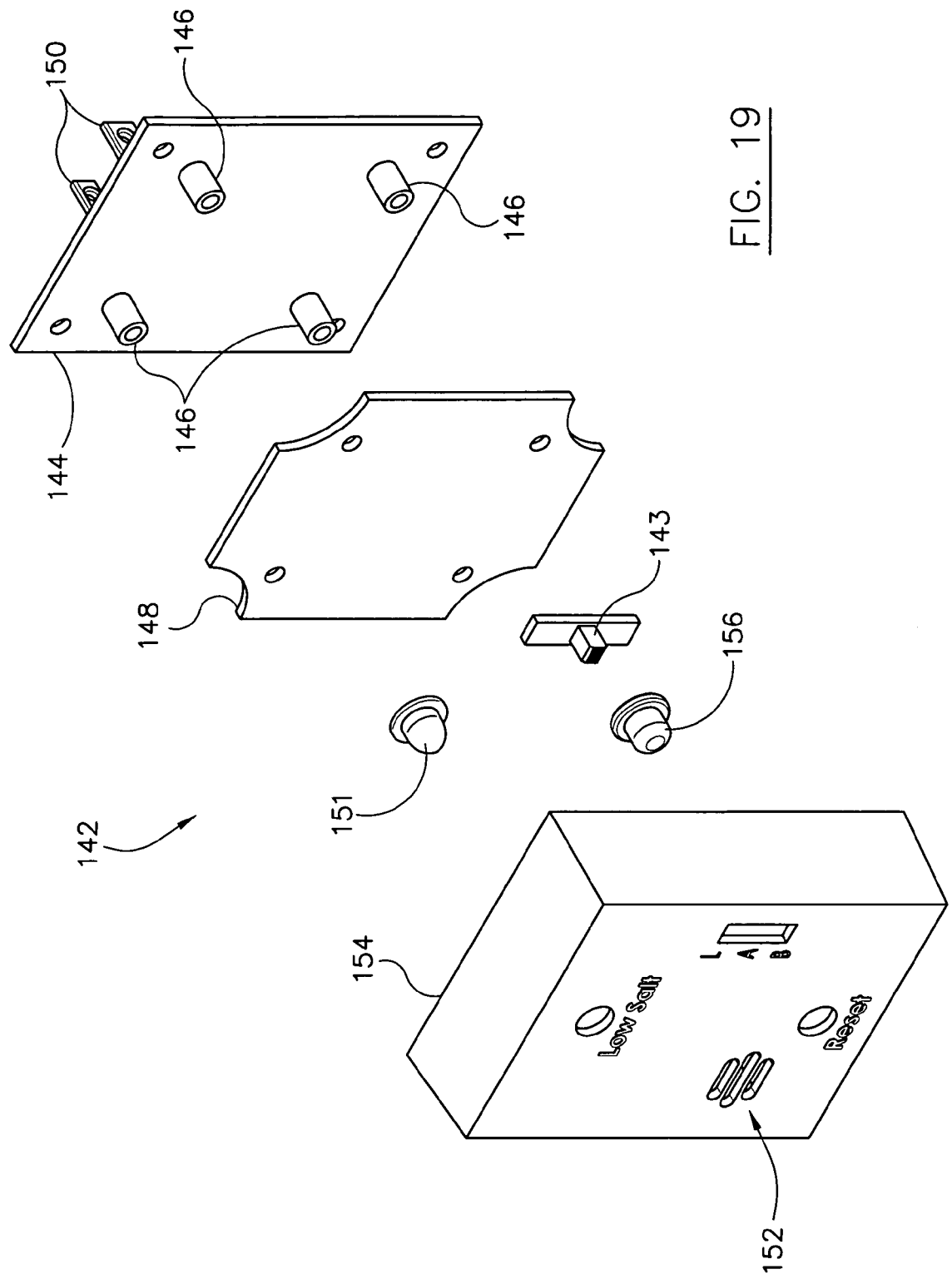
FIG. 19 is an exploded, isometric view of the alarm mechanism of FIG. 18.

With regard to each of the aforementioned embodiments of the invention, in addition to the incorporation of the lamps 108 and 132 and speakers 110 and 134 on the respective housings 80 and 114, the monitoring devices 42 and 112 can utilize a remote alarm mechanism 142, best shown in FIGS. 18–19, that can be spaced from the device 42 or 112. The mechanism 142 includes a receiver (not shown) that can receive a signal transmitted from the device 42, 112 in a known matter, that causes the mechanism 142 to activate and emit the audible and/or visual signal for an individual. The remote alarm mechanism 142 includes a base 144 having mounting stems 146 to which are secured a circuit plate 148 using fasteners (not shown). The base 144 includes a pair of prongs 150 that are operably connected to the plate 148 and engageable with a power source, e.g., battery source for placement anywhere, or a standard electrical outlet (not shown) in order to provide the power to the remote alarm mechanism 142. After switching on the mechanism 142 using a control switch 143, when a monitoring device 42 or 112 determines that the level of the salt within a tank 30 has reached a lower limit, the device 44 or 112 emits a signal that is received by the remote mechanism 142 which causes the mechanism 142 to actuate a lamp 151 and/or speaker 152 disposed on a housing 154 enclosing the circuit plate 148 and attached to the base 144 in order to provide a signal to an individual that the salt 202 within the tank 30 needs replenishing. Also, the mechanism 142 includes a reset button 156 on the housing 154 so that the individual may disable the operation of the lamp 150 and/or speaker 152 after receiving the notification from the device 42 or 112, for example, push wall disables selected alarm, push and hold disables alarm and light. The unit will re-notify if salt is not added to the tank. The mechanism 142 can be spaced significant distances from the device 42 or 112, and in any direction, with a distance of between ten (10) feet and one hundred fifty (150) feet being most useful.

In another embodiment, a capacitive plate may be encapsulated in plastic, the plate being a length near that of the brine tank, and fastened to the brine tank either inside or outside the tank. A cable would be attached to the plate to connect a sensor unit. This configuration may be used to monitor real time values of the level of salt in the tank.

While the preferred embodiments and best modes of utilizing the present invention have been disclosed above, other variations are also possible. For example, instead of a water softener salt tank, the device 42 or 112 can be utilized with any type of storage container used to hold an amount of material within the container. Further, while the structural components of each device 42 and 112 are preferably formed of a non-corrosive, insulating plastic material for use with water softeners, any other suitable rigid material, such as a metal, could be used. Also, while the calibration device 138 and alarm mechanism 142 are shown as being used with a single device 42 or 112, these items can be configured to transmit or receive signals from multiple devices 42 or 112 in order to monitor several tanks 30 simultaneously.

Various alternatives are contemplated as being within the scope of the following claims which particularly point out and extinct the claiming subject matter regarded as the invention.

I claim:

1. A device for monitoring the level of a solid substance in a container, the system comprising:
    (a) a rod having a lower end positionable within the container in engagement with an uppermost surface of the solid substance in the container, an upper end positionable outside of the container and a central, rigid member connecting the lower end and the upper end and slidably positioned with regard to the container; and (b) a sensor positionable on the container and capable of initiating an alarm signal in response to the upper end of the rod engaging the sensor.

2. The device of claim 1 wherein the central member of the rod is formed from a number of segments.

3. The device of claim 2 wherein the segments are releasably secured to one another.

4. The device of claim 2 wherein a number of the segments include a recess at one end and a locking member opposite the recess so that individual segments may be attached and detached as needed.

5. The device of claim 4 wherein rod segments are detached and placed through an opening in the sensor and then reattached so that the rod extends through the opening in the sensor.

6. The device of claim 1 wherein the sensor includes at least one of: a switch engageable by the upper end of the rod, and a battery.

7. The device of claim 1 wherein the sensor includes a base member positionable on the container and an alarm mechanism remotely spaced in another room from the base member, wherein the base member transmits an operating signal to the alarm mechanism when engaged by the upper end of the rod.

8. A device for monitoring the level of a substance through a wall of a container, the device comprising a first sensing member postionable on the container adjacent a lower end of the container, the first sensing member including a means for sensing through the wall of a container without physically penetrating the container wall and a first housing securable to the container, a first detecting mechanism positioned within the housing, an alarm mechanism operably connected to the first detecting mechanism, and a first power source operably connected to the first detecting mechanism and the alarm mechanism, wherein the first detecting mechanism is at least one of an induction-based detecting mechanism that senses the inductance of the substance and a capacitance-based detecting mechanism that senses the capacitance of the substance.

9. The device of claim 8 wherein the first detecting mechanism includes a stored lower limit capacitance value of a brine substance that is compared with an actual capacitance value of a brine substance sensed by the first detecting mechanism.

10. The device of claim 9 wherein the first sensing member includes a calibration mechanism operably connected to the first detecting mechanism and used to obtain the lower limit capacitance value.

11. The device of claim 8 wherein the first sensing member includes a timer operably connected to the first detecting mechanism and used to selectively operate the first detecting mechanism at predetermined intervals.

12. The device of claim 10 further comprising a second sensing member, the second sensing member including a second housing and a second detecting mechanism, wherein the second sensing member operates independently from the first sensing member to act as a variable gauge.

13. The device of claim 12 further comprising a second capacitive plate on a board along with a ground plate.

14. The device of claim 8 wherein the first power source is a battery operatively connected to the first detecting mechanism.

15. The device of claim 8 wherein the first detecting mechanism is calibrated to detect a solid material within the container, and an aqueous material within the container.

16. The device of claim 8 wherein the alarm mechanism is spaced from the first housing and receives a signal from the first detecting mechanism to operate the alarm mechanism.

17. The device of claim 8 wherein the alarm mechanism emits at least one of: an audible alarm, and a visible alarm.

18. The device of claim 8 wherein the first detecting mechanism is an electromagnetic wave-based detecting mechanism.

19. The device of claim 8, wherein the alarm is located remotely from the sensor and wherein the sensor wirelessly transmits a signal to the alarm.

20. The device of claim 17, wherein the sensor transmits a signal to trigger the alarm.

* * * * *